(12) United States Patent
Bhalgat et al.

(10) Patent No.: US 12,561,568 B2
(45) Date of Patent: Feb. 24, 2026

(54) DIMENSIONALITY TRANSFORMATION FOR EFFICIENT BOTTLENECK PROCESSING

(71) Applicant: QUALCOMM Incorporated, San Diego, CA (US)

(72) Inventors: Yash Sanjay Bhalgat, San Diego, CA (US); Fatih Murat Porikli, San Diego, CA (US); Jamie Menjay Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1045 days.

(21) Appl. No.: 17/651,549

(22) Filed: Feb. 17, 2022

(65) Prior Publication Data

US 2023/0259773 A1     Aug. 17, 2023

(51) Int. Cl.
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC .......... G06N 3/082; G06N 3/04; G06N 3/063; G06N 3/0464; G06N 3/08; G06N 3/02; G06N 3/084; G06N 3/086; G06N 3/088; G06N 3/091; G06N 3/092; G06N 3/094; G06N 3/096; G06N 3/098; G06F 9/50; G06F 17/30
See application file for complete search history.

(56) References Cited

U.S. PATENT DOCUMENTS

| | | | |
|---|---|---|---|
| 11,449,714 B2 * | 9/2022 | Bazarevsky | ......... G06V 10/764 |
| 2019/0147318 A1 * | 5/2019 | Howard | ................. G06N 3/045 |
| | | | 706/27 |
| 2021/0019593 A1 | 1/2021 | Lin et al. | |
| 2021/0089889 A1 * | 3/2021 | Gope | ..................... G06N 3/045 |
| 2021/0374537 A1 | 12/2021 | Bhalgat et al. | |
| 2023/0290134 A1 * | 9/2023 | Hu | ..................... G06V 10/7715 |

FOREIGN PATENT DOCUMENTS

WO          2022020386 A1     1/2022

OTHER PUBLICATIONS

Squeezenet: Alexnet-Level Accuracy With 50X Fewer Parameters and <0.5MB Model Size Forrest N. Iandola, Song Han, Matthew W. Moskewicz1 Khalid Ashraf, William J. Dally, Kurt Keutzer (Year: 2016).*
Happycube/tensorflow, GitHub, Jun. 14, 2016. Retrieved from <https://github.com/happycube/tensorflow-1/blob/master/tensorflow/g3doc/api_docs/python/functions_and_classes/shard6/tf.space_to_depth.md> (Year: 2016).*

(Continued)

*Primary Examiner* — Miranda M Huang
(74) *Attorney, Agent, or Firm* — Patterson & Sheridan LLP

(57) ABSTRACT

Certain aspects of the present disclosure provide techniques for efficient bottleneck processing via dimensionality transformation. The techniques include receiving a tensor, and processing the tensor in a bottleneck block in a neural network model, comprising applying a space-to-depth tensor transformation, applying a depthwise convolution, and applying a depth-to-space tensor transformation.

30 Claims, 8 Drawing Sheets

(56)       References Cited

OTHER PUBLICATIONS

MobileNetV2: Inverted Residuals and Linear Bottlenecks Mark Sandler, Andrew Howard, Menglong Zhu, Andrey Zhmoginov, Liang-Chieh Chen (Year: 2018).*

Wayback Machine, TensorFlow, Jan. 30, 2019 Retrieved from <https://web.archive.org/web/20190130121603/https://www.tensorflow.org/api_docs/python/tf/nn/space_to_depth> (Year: 2019).*

Wayback Machine, TensorFlow, Jan. 30, 2019 Retrieved from <https://web.archive.org/web/20190130121642/https://www.tensorflow.org/api_docs/python/tf/nn/depth_to_space> (Year: 2019).*

Review of deep learning: concepts, CNN architectures, challenges, applications, future directions Alzubaidi, L., Zhang, J., Humaidi, A.J et al. Review of deep learning: concepts, CNN architectures, challenges, applications, future directions. J Big Data 8, 53 (2021). https://doi.org/10.1186/s40537-021 (Year: 2021).*

Alibaba-MIIL/TResNet, GitHub, Jan. 7, 2021. Retrieved from <https://github.com/Alibaba-MIIL/TResNet/blob/master/src/models/tresnet_v2/layers/space_to_depth.py> (Year: 2021).*

TResNet/README, GitHub, Jan. 7, 2021. Retrieved from <https://github.com/tczhangzhi/torch-tresnet/blob/master/README.md> (Year: 2021).*

Taeoh Kim et al., Block-Attentive Subpixel Prediction Networks for Computationally Efficient Image Restoration, IEEE (Year: 2021).*

International Search Report and Written Opinion—PCT/US2023/061344—ISA/EPO—May 12, 2023.

* cited by examiner

600

700

Receive a first tensor     705

Process the first tensor in a bottleneck block in a neural network model, comprising applying a space-to-depth tensor transformation; applying a depthwise convolution; and applying a depth-to-space tensor transformation     710

Process a subsequent block in the neural network model     715

DIMENSIONALITY TRANSFORMATION FOR EFFICIENT BOTTLENECK PROCESSING

INTRODUCTION

Aspects of the present disclosure relate to machine learning, and more specifically, to improving the efficiency of model processing.

Artificial neural networks can be used to generate inferences for a wide variety of domains with substantial success. A significant number and diversity of neural network architectures have been proposed for various tasks, such as recurrent neural networks (RNNs), convolutional neural networks (CNNs), and the like. Generally, a neural network includes a number of neurons or nodes distributed across a series of layers with weighted edges connecting the neurons between layers.

Many neural network architectures use bottleneck blocks or layers at one or more points in the model. A bottleneck can generally be considered as a layer with relatively fewer neurons (e.g., where the tensors being processed are smaller, with fewer elements), as compared to the immediately preceding and following layers. Such bottleneck blocks can be useful to reduce the number of features in the data at various points in the model, which can reduce computational resources needed while simultaneously improving generalization, which helps to prevent overfitting. However, existing bottleneck architectures still impose significant computational overhead.

Accordingly, improved bottleneck architectures are needed to improve processing efficiency of machine learning models.

BRIEF SUMMARY

Certain aspects provide a method, comprising: receiving a first tensor; and processing the first tensor in a bottleneck block in a neural network model, comprising: applying a space-to-depth tensor transformation; applying a depthwise convolution; and applying a depth-to-space tensor transformation.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
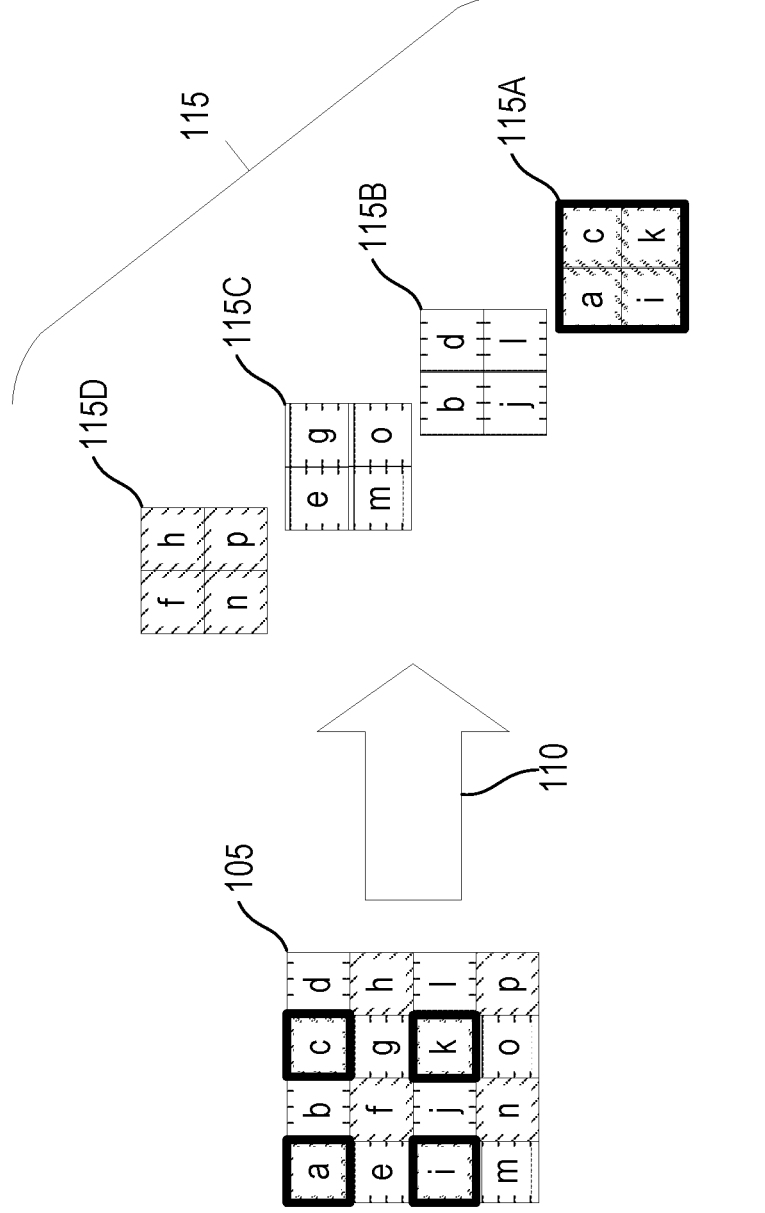
FIG. 1 depicts an example space-to-depth dimensionality transformation technique.

Aspects of the present disclosure provide techniques for processing data in neural network bottleneck blocks more efficiently via dimensionality transformations.

Typically, the initial layers of a neural network operate on features with large spatial sizes (e.g., height and width for image or video input data) and a relatively smaller number of channels (also referred to as depth in some aspects), which requires a large number of multiply-accumulate (MAC) operations relative to the number of parameters in these layers. To improve efficiency, some CNN architectures employ heavy spatial downsampling in the early layers, which can cause significant loss of information, and thus negatively impacts model performance.

Additionally, many convolutional neural network architectures require a larger receptive field in the initial layers to improve accuracy. Thus, due to the large spatial sizes of the inputs to these initial layers, large kernel sizes with large receptive fields are often used to effectively aggregate global spatial information. However, such large kernel sizes can introduce significant computational complexity and memory access latency, which negatively impacts model performance.

In aspects of the present disclosure, bottleneck blocks that incorporate dimensionality transformation techniques are provided that transfer computations in the spatial dimension to the channel dimension via space-to-depth operations, which improves the efficiency of the data processing. This efficiency is realized because the subsequent depthwise convolutions are more efficient when operating on the smaller spatial dimensions, despite the increased channel dimensionality, because a smaller total number of operations are needed.

The bottleneck blocks described herein can further include depth-to-space operations in order to restore the desired dimensionality of the layer output. In some aspects, these space-to-depth operations (and accompanying depth-to-space operations) can be implemented using hardware or accelerators, allowing them to be performed efficiently and with reduced latency.

Such space-to-depth bottleneck blocks can provide substantially improved receptive fields (enabling kernels to effectively cover larger areas of input tensors, without increased computational overhead), as compared to conventional bottlenecks, because transferring computation from spatial dimensions to the channel dimension aggregates spatial information with a larger receptive field (e.g., up to r times larger using the same size kernels, where r is a spatial expansion ratio used to configure the space-to-depth operation). This can allow the neural network to achieve or exceed performance of comparable existing architectures while using fewer computation operations, thereby leading to lower latency in data processing. Notably, applying such space-to-depth techniques across depthwise convolution layers results in a negligible increase of overall model size. Accordingly, model performance is improved with minimal additional model complexity.

In some aspects, the spatial expansion ratio may be selected based on a desired spatial dimensionality of the depthwise layer of the depthwise bottleneck, or based on a desired maximum number of operations needed to perform the depthwise convolution. For example, if the spatial dimensionality of the bottleneck convolution (or the number of operations needed for the bottleneck convolution) exceeds a threshold, then the spatial expansion ratio may be defined (e.g., by an administrator or user) to ensure that the desired spatial dimensionality is met, such that the number of operations needed to perform the depthwise convolution is less than or equal to a desired maximum value.

Aspects of the present disclosure can generally be applied to improve the computational efficiency of processing data using bottleneck layers (or blocks) of a neural network both during training (while training data is passed through the model) and during runtime (when new data is passed through to generate inferences).

Example Element-to-Depth Technique

FIG. 1 depicts an example space-to-depth dimensionality transformation technique on an element-by-element basis. That is, the illustrated example includes a space-to-depth transformation 110 that reduces the spatial dimensionality of an input data tensor 105 by expanding the channel or depth dimensionality of the tensor. Thus, information is preserved while the input data is transformed in "shape." Advantageously, performing depthwise convolution on this transformed tensor is more efficient, as the computations can be performed more efficiently on tensors with smaller spatial dimensionality and larger channel dimensionality, as compared to tensors with larger spatial dimensionality and smaller channel dimensionality.

As illustrated, the input tensor 105 has a spatial dimensionality (e.g., height and width), and a channel dimensionality (e.g., depth). Although the illustrated tensor 105 has a single channel (e.g., a channel dimensionality of one) and spatial dimensionality of four in height and width for ease of illustration, aspects of the present disclosure are readily applicable to tensors of any dimensionality.

In the illustrated aspect, the space-to-depth transformation 110 rearranges the input tensor 105 to an output tensor 115. Specifically, the space-to-depth transformation 110 reduces the spatial dimensionality of the input tensor 105 (e.g., from 4×4 to 2×2 in the illustrated example) while increasing the channel dimensionality a corresponding amount (e.g., from one to four in the illustrated example) to maintain the "volume" of the tensor (e.g., the number of elements in the tensor). That is, the volume of the output tensor 115 remains the same as the volume of the input tensor 105 because 4×4×1=2×2×4. In this way, no data is lost in the space-to-depth transformation 110 (e.g., all data elements in the input tensor 105 are included in the output tensor 115).

The particular rearrangement or modification used to transform the input tensor 105 is defined at least partially based on a spatial expansion ratio, r, which is a configurable hyperparameter. In some aspects, the spatial expansion ratio may be defined by a user or administrator to transform an input tensor to a tensor having a desired spatial dimensionality of a depthwise convolution. For example, suppose the desired spatial dimensionality of the bottleneck is M×M but the input tensor has a greater spatial dimensionality of N×N. In such an example, the user may select a spatial expansion ratio that will cause the input tensor to be converted to an intermediate tensor with the desired spatial dimensionality of M×M.

In some aspects, the space-to-depth transformation 110 converts an input tensor of size C×H×W into an output tensor of size $$C * r^2 \times \frac{H}{r} \times \frac{W}{r},$$

where C is the number of channels (also referred to as the depth of the tensor), H and W are spatial dimensions (e.g., height and width) of the tensor, and r is the spatial expansion ratio. In the illustrated aspect, C=1, H=W=4, and r=2.

In some cases, the space-to-depth transformation 110 may be referred as a pixel-to-depth transformation or element-to-depth as described herein, because the tensor transformation is performed on a pixel-by-pixel (or element-by-element) basis, where each element in the original input tensor 105 is processed independently and may not remain next to the same adjacent elements in the output tensor 115. For conceptual clarity as to how the elements are rearranged, elements a, c, i and k, which are placed in a first channel 115A of the output tensor 115, are highlighted. In the illustrated aspect, elements a, c, i, and k in the input tensor 105 have been placed in a first channel 115A of the output tensor 115, elements b, d, j, and l in the input tensor 105 have been placed in a second channel 115B of the output tensor 115, elements e, g, m, and o in the input tensor 105 have been placed in a third channel 115C of the output tensor 115, and elements f, h, n, and p in the input tensor 105 have been placed in a fourth channel 115D of the output tensor 115.

In various aspects, the particular rearrangement of the elements (e.g., which elements in the input are assigned to which channels in the output) may vary based on the particular implementation and architecture of the model. Generally, however, the space-to-depth transformation will be fixed in that each position in the input tensor is associated with a corresponding fixed position in the output tensor (e.g., the element in the upper left corner of the input tensor 105 will always be placed in the upper left corner of the first channel of the output tensor 115). Because the space-to-depth transformation 110 is a fixed rearrangement of elements, it can be implemented efficiently via hardware or with hardware acceleration.

Although the illustrated example includes a space-to-depth transformation 110, a complementary depth-to-space transformation can be used to effectively reverse the dimensionality transformation. That is, a depth-to-space transformation using the same spatial expansion ratio r may be used to increase the spatial dimensionality of an input tensor while decreasing the channel dimensionality and maintaining the volume of the tensor (e.g., converting the tensor 115 to the tensor 105).

Example Region-to-Depth Technique

Figure 2:
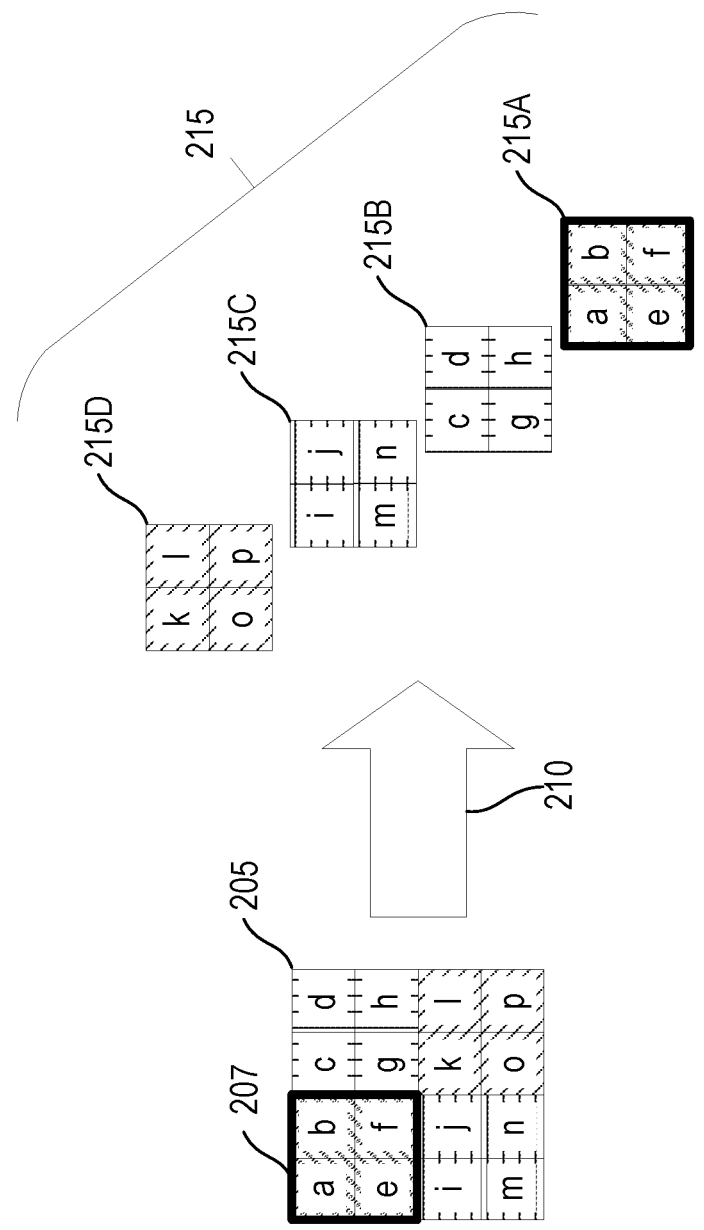
FIG. 2 depicts an example space-to-depth dimensionality transformation technique.

FIG. 2 depicts an example space-to-depth dimensionality transformation technique on a region-by-region basis. In contrast to the space-to-depth transformation 110 in FIG. 1 (which operated on an element-by-element basis), the space-to-depth transformation 210 rearranges on the level of non-overlapping regions in the input tensor, as indicated by shading in the illustrated example. For conceptual clarity as to how the regions are delineated, a first region 207, which includes elements a, b, e and f, is also highlighted. In some aspects, the space-to-depth transformation 210 may be referred to as a region-to-depth transformation.

In the illustrated aspect, the space-to-depth transformation 210 rearranges the input tensor 205 to an output tensor 215 by reducing the spatial dimensionality of the input tensor 205 (e.g., from 4×4 to 2×2 in the illustrated example) while increasing the channel dimensionality a corresponding amount (e.g., from one to four in the illustrated example) to maintain the volume of the tensor. As with the space-to-depth transformation 110 depicted in FIG. 1, no data is lost in the space-to-depth transformation 210 (e.g., all data elements in the input tensor 205 are included in the output tensor 215).

As above, the particular rearrangement or modification used to transform the input tensor 205 is defined at least partially based on a spatial expansion ratio, which may be a configurable hyperparameter. In a similar manner to the space-to-depth transformation 110 in FIG. 1, the space-to-depth transformation 210 converts an input tensor of size C×H×W into an output tensor of size $$C * r^2 \times \frac{H}{r} \times \frac{W}{r},$$

where C is the number of channels (also referred to as the depth of the tensor), H and W are spatial dimensions (e.g., height and width) of the tensor, and r is the spatial expansion ratio. In the illustrated aspect, C=1, H=W=4, and r=2.

The space-to-depth transformation 210, however, may be referred as a region-to-depth transformation because the tensor rearrangement is performed on a region-by-region basis. Specifically, in the illustrated aspect, the first region 207 (including elements a, b, e, and f in the input tensor 205) has been placed in a first channel 215A of the output tensor 215, a second region including elements c, d, g, and h in the input tensor 205 has been placed in a second channel 215B of the output tensor 215, a third region including elements i, j, m, and n in the input tensor 205 has been placed in a third channel 215C of the output tensor 215, and a fourth region including elements k, l, o, and p in the input tensor 205 has been placed in a fourth channel 215D of the output tensor 215.

In various aspects, the particular rearrangement of the regions (e.g., which regions in the input are assigned to which channels in the output) may vary based on the particular implementation and architecture of the model. Generally, however, the space-to-depth transformation will be fixed in that each region in the input tensor is associated with a corresponding fixed channel in the output tensor (e.g., the region in the upper left corner of the input tensor 205 will always be placed in the first channel of the output tensor

215). Because the space-to-depth transformation 210 is a fixed rearrangement of regions, it can be implemented efficiently via hardware or with hardware acceleration.

Although the illustrated example includes a space-to-depth transformation 210, a complementary depth-to-space transformation can be used to effectively reverse the dimensionality transformation. That is, a depth-to-space transformation using the same spatial expansion ratio r may be used to increase the spatial dimensionality of an input tensor while decreasing the channel dimensionality and maintaining the volume of the tensor (e.g., converting the tensor 215 to the tensor 205).

In various aspects, the region-based space-to-depth transformation 210 can be used as an alternative to the element-based space-to-depth transformation 110 depicted in FIG. 1. The space-to-depth transformation 210 has the same expressivity as the space-to-depth transformation 110, but may provide advantages in some implementations, such as improved spatial gating (a spatial version of channel gating).

Figure 3:
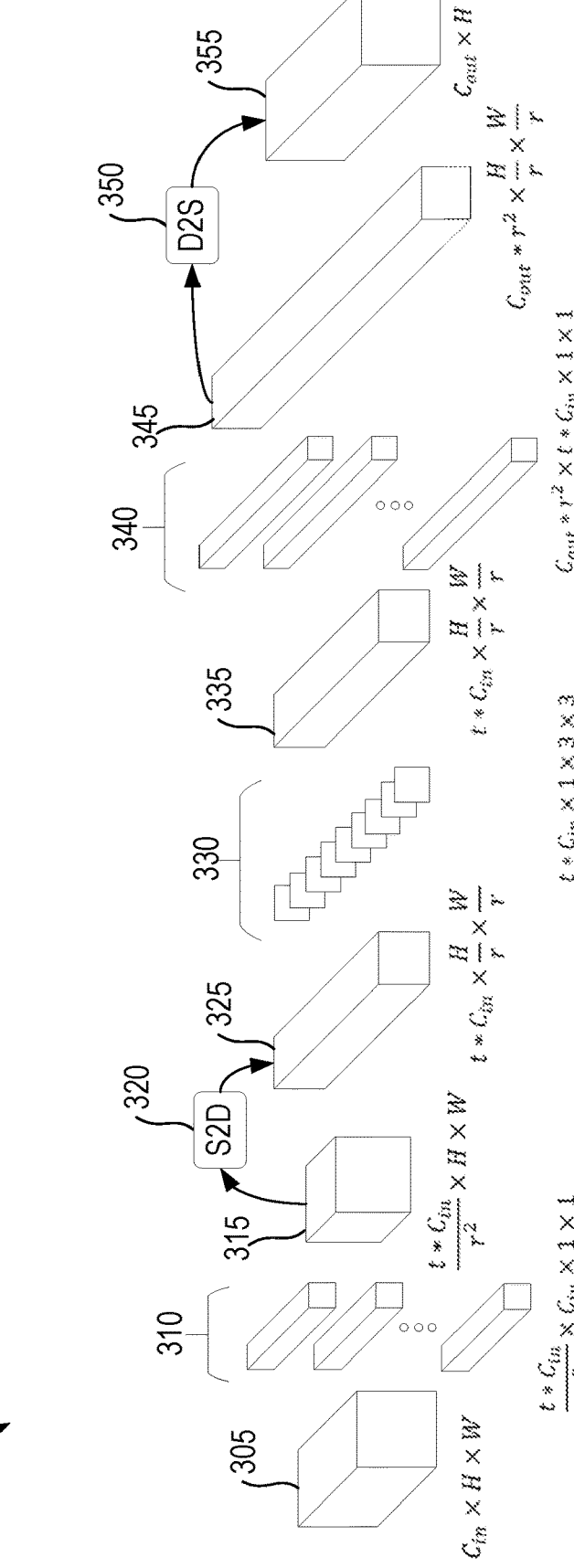
FIG. 3 depicts an example bottleneck block with dimensionality transformations to improve processing efficiency.

Example Bottleneck Block With Dimensionality Transformations Spanning Pointwise Convolution FIG. 3 depicts an example bottleneck block 300 with dimensionality transformations to improve processing efficiency. The bottleneck block 300 generally includes a depthwise convolution 330, along with a space-to-depth transformation 320 and corresponding depth-to-space transformation 350 used before and after the bottleneck convolution, respectively. By using these dimensionality transformations, the bottleneck block 300 can operate more efficiently (e.g., with reduced latency and computational resources).

In the bottleneck block 300, the number of channels in the input tensor 305 is first reduced using a first 1×1 (pointwise) convolution 310, thereby reducing the memory and MAC count for the subsequent convolutions.

Specifically, an input tensor 305 of size $C_{in} \times H \times W$ is convolved using $$\frac{tC_{in}}{r^2}$$

pointwise convolution kernels, where each such kernel has dimensionality of $C_{in} \times 1 \times 1$, and where $C_{in}$ is the number of channels in the input tensor 305, H and W are the spatial dimensions of the input tensor 305, t is a channel expansion ratio, and r is the spatial expansion ratio discussed above. In at least one aspect, the input tensor 305 is an activation tensor as input to a layer of a neural network, and the kernels correspond to weights of that layer.

Although the illustrated example uses $$\frac{tC_{in}}{r^2}$$

pointwise kernels for the pointwise convolution 310, any number of pointwise kernels can be used. The illustrated bottleneck block 300 uses $$\frac{tC_{in}}{r^2}$$

US 12,561,568 B2

7 pointwise kernels for the pointwise convolution 310 merely to reflect the traditional configuration of conventional bottleneck blocks, which use $tC_{in}$ kernels for the first pointwise convolution.

As illustrated, this first pointwise convolution 310 results in an intermediate tensor 315 with dimensionality $$\frac{tC_{in}}{r^2} \times H \times W.$$

That is, the intermediate tensor 315 has the same spatial dimensions, with a changed (e.g., reduced) channel depth.

Intermediate tensor 315 is then processed using a space-to-depth transformation 320 (e.g., an element-based dimensionality transformation or a region-based dimensionality transformation) to generate another intermediate tensor 325 with increased depth (e.g., more channels) and reduced spatial dimensionality. In the illustrated example, the intermediate tensor 325 has dimensionality $$tC_{in} \times \frac{H}{r} \times \frac{W}{r},$$

and the spatial dimensionality has been reduced by r.

The depthwise convolution 330 can then be applied to a tensor 325 with reduced spatial size, as compared to the original input tensor 305, which means the depthwise convolution 330 can be performed using fewer computation operations. Thus, the space-to-depth operation 320 beneficially reduces latency and computational resources without reducing information in the input data. In the illustrated bottleneck block 300, the depthwise convolution 330 is performed using $tC_{in}$ depthwise convolution kernels, where each such kernel has dimensionality of 1×3×3. Although depthwise convolution kernels with spatial sizes of 3×3 are illustrated, the depthwise kernels may be of any spatial size in other examples.

Although the illustrated example uses $tC_{in}$ depthwise kernels for the depthwise convolution 330, other numbers of kernels can be used. In some aspects, the number of depthwise kernels used for the depthwise convolution 330 is selected to align with the channel dimensionality of the preceding layer (e.g., of the tensor 325).

Advantageously, due to the space-to-depth transformation 320, the depthwise convolution 330 can effectively serve as a dilated convolution (covering an increased receptive field in the original input tensor 305, as compared to conventional bottlenecks), which can enhance model accuracy.

As illustrated, the depthwise convolution 330 results in another intermediate tensor 335 with dimensionality that matches the intermediate tensor 325

$$\left(e.g., tC_{in} \times \frac{H}{r} \times \frac{W}{r}\right).$$

After the depthwise convolution 330, the bottleneck block 300 includes a second pointwise convolution 340, which is performed using $r^2C_{out}$ pointwise convolution kernels, each with dimensionality of $tC_{in} \times 1 \times 1$. The resulting intermediate tensor 345 has dimensionality $$r^2 C_{out} \times \frac{H}{r} \times \frac{W}{r}.$$

8

Although the illustrated example uses $r^2C_{out}$ pointwise kernels for the second pointwise convolution 340, other numbers of kernels can be used. In some aspects, the number of kernels used for the pointwise convolution 340 is selected to ensure that the resulting tensor 345 has $r^2C_{out}$ channels, causing the final output tensor 355 to have $C_{out}$ channels (after the depth-to-space transformation 350 is performed).

The depth-to-space transformation 350 can then be used to convert the intermediate tensor 345 to an output tensor 355 with dimensionality $C_{out} \times H \times W$. In some aspects, the bottleneck block 300 is configured such that the dimensionality of the output tensor 355 matches the dimensionality of a conventional bottleneck block, allowing the efficient bottleneck block 300 to be substituted easily without reconfiguring the rest of the network.

In the bottleneck block 300, the second pointwise convolution 340 aggregates the channel information in the output features of the depthwise convolution 330, and the depth-to-space operation 350 is then applied.

Advantageously, the bottleneck block 300 can use approximately the same number of parameters as compared to conventional bottlenecks (without the space-to-depth transformation 320 or depth-to-space transformation 350), but requires substantially fewer operations. For example, if the depthwise convolution 330 is performed using 3×3 kernel(s), then a conventional bottleneck block requires $tC_{in}^2 + 9tC_{in} + tC_{in}C_{out}$ parameters and can be performed using $tC_{in}HW*(C_{in}+9+C_{out})$ MACs. In contrast, the more efficient bottleneck block 300 requires $$\frac{tC_{in}^2}{r^2} + 9tC_{in} + tC_{in}C_{out}r^2$$

parameters and can be performed using $$tC_{in}HW * \left(\frac{C_{in}}{r^2} + \frac{9}{r^2} + C_{out}\right) MACs.$$

This reduced number of MAC operations can reduce the latency and computational resources needed to process data using the bottleneck block 300.

In some aspects, the bottleneck block 300 is selectively used based on the characteristics of the device performing the convolution. For example, if the computational resources (which may include processing power, memory, energy availability (e.g., whether the device uses battery power), and the like) meet certain thresholds, then the system may use a conventional bottleneck. In contrast, if the processing device is a low power device with reduced computational resources or energy availability that do not meet the threshold(s) (such as a mobile device or other battery powered device), then the system may replace the conventional bottleneck with the efficient bottleneck block 300 that uses space-to-depth and depth-to-space dimensionality transformations to improve computational efficiency. This can allow more powerful devices to retain the full accuracy of the model, while less powerful devices can achieve similar accuracy with reduced computational complexity.

In some aspects, if the bottleneck block 300 is used, then it can replace all of the bottlenecks in a given neural network architecture. In other aspects, however, the bottleneck block 300 can be selectively used to replace only a subset of the existing (conventional) bottlenecks. For example, the bottleneck block 300 may be used to replace only the last conventional bottleneck in the architecture, the second-to-last bottleneck, all bottlenecks in the second half of the architecture, and the like. This can improve the accuracy of the assembled model. Thus, the amount of conventional bottleneck blocks replaced by efficient bottleneck blocks, such as 300, may be a hyperparameter in various examples.

Figure 4:
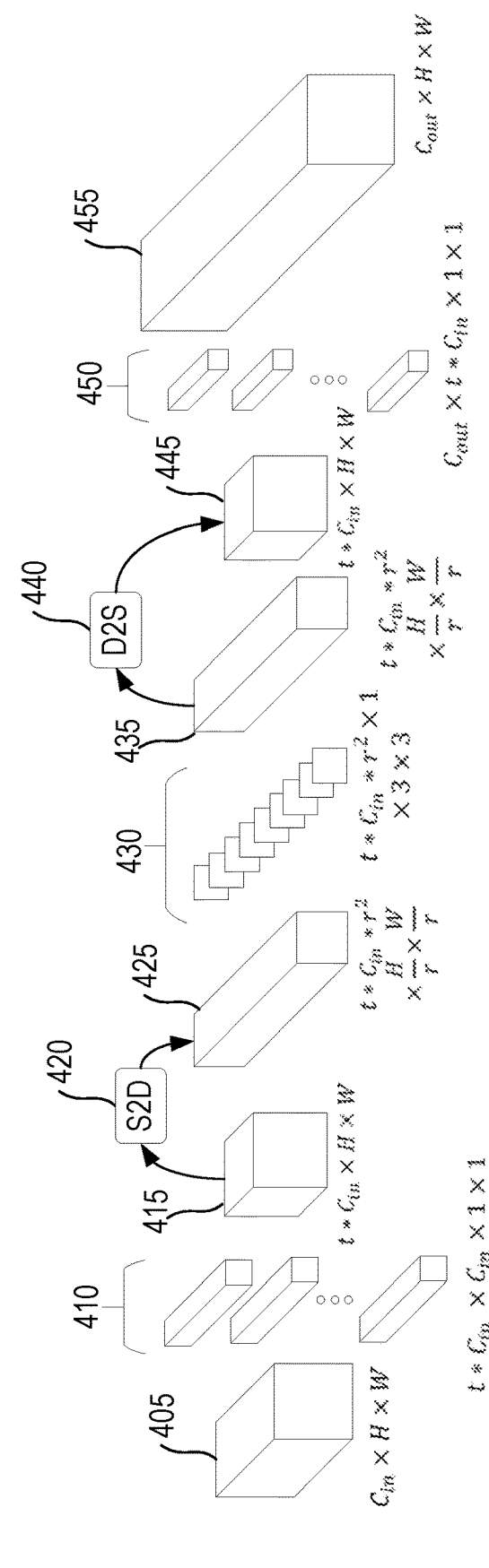
FIG. 4 depicts another example bottleneck block with dimensionality transformations to improve processing efficiency.

Example Bottleneck Block With Dimensionality Transformations Spanning Depthwise Convolution FIG. 4 depicts an example bottleneck block 400 with dimensionality transformations to improve processing efficiency. The bottleneck block 400 generally includes a depthwise convolution 430, with a space-to-depth transformation 420 and corresponding depth-to-space transformation 440 used before and after the bottleneck convolution, respectively. By using these dimensionality transformations, the bottleneck block 400 can operate more efficiently (e.g., with reduced latency and computational resources).

While the bottleneck block 300 discussed with respect to FIG. 3 used a modified first pointwise convolution to reduce the channel depth of the input, the bottleneck block 400 can use the same pointwise convolutions as a conventional bottleneck. In the bottleneck block 400, the space-to-depth and depth-to-space operations are applied across the depthwise separable convolution layer (immediately before and after), as discussed in more detail below.

In the bottleneck block 400, the input tensor 405 is first processed using a first 1×1 (pointwise) convolution 410. Specifically, an input tensor 405 of size $C_{in}$×H×W is convolved using $tC_{in}$ pointwise convolution kernels, where each such kernel has dimensionality of $C_{in}$×1×1, and where $C_{in}$ is the number of channels in the input tensor 405, H and W are the spatial dimensions of the input tensor 405, t is a channel expansion ratio, and r is the spatial expansion ratio discussed above.

Although the illustrated example uses $tC_{in}$ pointwise kernels for the pointwise convolution 410, other numbers of pointwise kernels can be used. The illustrated bottleneck block 400 uses $tC_{in}$ pointwise kernels for the pointwise convolution 410 to mirror the traditional configuration of conventional bottleneck blocks.

As illustrated, this first pointwise convolution results in an intermediate tensor 415 with dimensionality $tC_{in}$×H×W. That is, the intermediate tensor 415 has the same spatial dimensions with a changed channel depth based only on the channel expansion ratio t.

In the bottleneck block 400, the intermediate tensor 415 is then processed using a space-to-depth transformation 420 (e.g., an element-based dimensionality transformations or a region-based dimensionality transformation) to generate an intermediate tensor 425 with increased depth (e.g., more channels) and reduced spatial dimensionality. In the illustrated example, the intermediate tensor 425 has dimensionality $$r^2 tC_{in} \times \frac{H}{r} \times \frac{W}{r}.$$

The depthwise convolution 430 can then be applied to the tensor 425, which has reduced spatial size as compared to the original input tensor 405. Thus, the depthwise convolution 430 can be performed using fewer computation operations, which beneficially reduces latency and computational resources. In the illustrated bottleneck block 400, the depthwise convolution 430 is performed using $r^2 tC_{in}$ depthwise convolution kernels (while a conventional block uses $tC_{in}$ kernels), where each such kernel has dimensionality of 1×3×3 in this example. Although depthwise convolution kernels with spatial sizes of 3×3 are illustrated, the depthwise kernels may be of any spatial size in other examples.

Although the illustrated example uses $r^2 tC_{in}$ depthwise kernels for the depthwise convolution 430, other numbers of kernels can be used. In some aspects, the number of depthwise kernels used for the depthwise convolution 430 is selected to align with the channel dimensionality of the preceding layer (e.g., of the tensor 425).

Advantageously, due to the space-to-depth transformation 420, the depthwise convolution 430 can effectively serve as a dilated convolution (covering an increased receptive field in the original input tensor 405, as compared to conventional bottlenecks), which can enhance model accuracy.

As illustrated, the depthwise convolution 430 results in an intermediate tensor 435 with dimensionality that matches the intermediate tensor 425

$$\left( e.g., \ r^2 tC_{in} \times \frac{H}{r} \times \frac{W}{r} \right).$$

Subsequent to the depthwise convolution 430, a depth-to-space transformation 440 can then be used to convert the intermediate tensor 435 to an intermediate tensor 445 with dimensionality $tC_{in}$×H×W.

The bottleneck block 400 then includes a second pointwise convolution 450, which is performed using $C_{out}$ pointwise convolution tensors, each with dimensionality of $tC_{in}$×1×1. The resulting output tensor 455 has dimensionality $C_{out}$×H×W. In some aspects, the bottleneck block 300 is configured such that the dimensionality of the output tensor 355 matches the dimensionality of a conventional bottleneck block, allowing the efficient bottleneck block 300 to be substituted easily without reconfiguring the rest of the network.

Although the illustrated example uses $C_{out}$ pointwise kernels for the second pointwise convolution 450, other numbers of kernels can be used. In some aspects, the number of kernels used for the pointwise convolution 450 is selected to ensure that the resulting output tensor 455 has $C_{out}$ channels.

Advantageously, the bottleneck block 400 uses the exact same number of operations (e.g., MACs) as compared to conventional bottlenecks (without the space-to-depth transformation 420 or depth-to-space transformation 440), while using slightly more parameters. For example, if the depthwise convolution 430 is performed using 3×3 kernel(s), then a conventional bottleneck block requires $tC_{in}^2 + 9tC_{in} + tC_{in}C_{out}$ parameters and can be performed using $tC_{in}HW*(C_{in} + 9 + C_{out})$ MACs. In contrast, the bottleneck block 400 requires the same number of operations and $tC_{in}^2 + 9tC_{in}r^2 + tC_{in}C_{out}$ parameters.

In some aspects, in a similar manner to the bottleneck block 300 depicted in FIG. 3, the bottleneck block 400 can be selectively used based on the characteristics of the device performing the convolution (e.g., based on the computational resources of the device that will process the bottleneck). Similarly, the bottleneck block 400 may be used to selectively replace only a subset of the conventional bottlenecks in an architecture, such as only the last conventional bottleneck in the architecture, the second-to-last bottleneck, all bottlenecks in the second half of the architecture, and the like. This can improve the accuracy of the assembled model.

Figure 5:
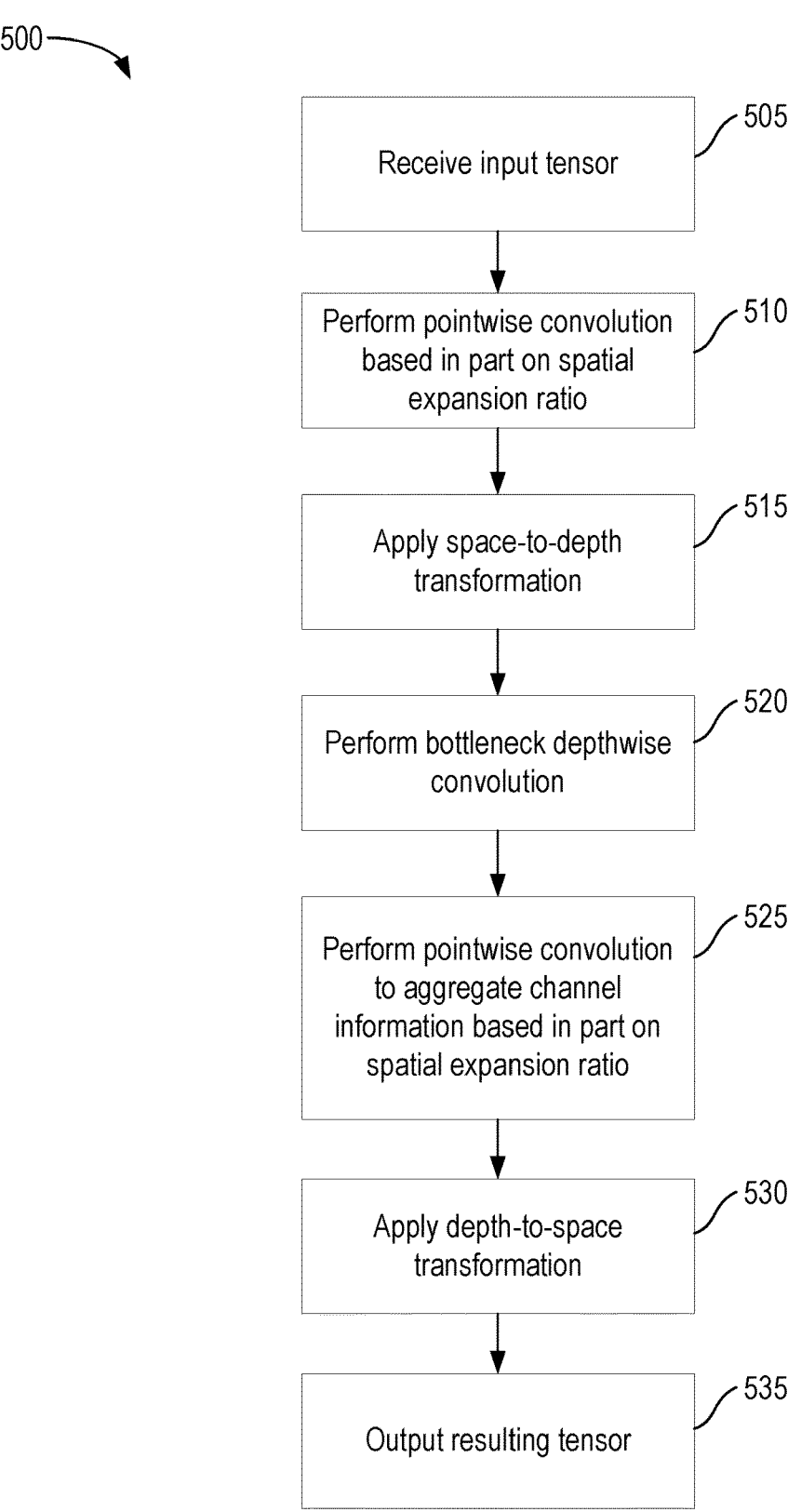
FIG. 5 is an example flow diagram illustrating a method for processing data tensors in a bottleneck block using dimensionality transformations to improve efficiency.

Example Method for Processing Data Using Dimensionality Transformations Across Pointwise Convolution FIG. 5 is an example flow diagram illustrating a method 500 for processing data tensors in a bottleneck block using dimensionality transformations to improve processing efficiency. In one aspect, the method 500 corresponds to the bottleneck block 300 described above with reference to FIG. 3.

In some aspects, as discussed above, the method 500 may be selectively used to replace one or more conventional bottlenecks in an existing neural network architecture. For example, the method 500 may be used by low power devices, only in selected portions of the model (e.g., in the latter half of the model), and the like.

The method 500 begins at block 505 with receiving an input tensor. In some cases, the input tensor may be an original input to a model, whereas in other cases the input tensor may be an output tensor from a prior layer in the model. Generally, the input tensor has a shape defined by a spatial dimensionality (e.g., a height and width in the context of certain types of input data, such as image and video input data) and a channel dimensionality (also referred to as depth).

At block 510, a pointwise convolution is performed on the input tensor based at least in part on a spatial expansion ratio (also referred to as a spatial factor in some aspects) in order to generate an intermediate tensor. For example, the processing system may use the pointwise convolution to reduce the number of channels in the input tensor based in part on the spatial expansion ratio, as discussed above with reference to pointwise convolution 310 in FIG. 3.

The method 500 then continues to block 515, where a space-to-depth transformation is applied to the intermediate tensor (generated using the pointwise convolution in block 510) to reduce the spatial dimensionality of the intermediate tensor and increase the channel dimensionality, while maintaining the volume of the intermediate tensor. This space-to-depth transformation can include any suitable dimensionality transformation, such as the element-wise transformation discussed with reference to FIG. 1, the region-wise transformation discussed with respect to FIG. 2, and the like.

At block 520, a depthwise convolution is performed on the transformed intermediate tensor to generate a second intermediate tensor.

The method 500 then continues to block 525, where a pointwise convolution is performed on the second intermediate tensor to aggregate the channel information of the second intermediate tensor based at least in part on the spatial expansion ratio. For example, a discussed above with reference to FIG. 3, the pointwise convolution may be used to change the number of channels in the second intermediate tensor based in part on the spatial expansion ratio. This results in a third intermediate tensor.

At block 530, a depth-to-space transformation may be applied to the third intermediate tensor (generated using the pointwise convolution in block 525) to increase the spatial dimensionality of the tensor and reduce the channel dimensionality, while maintaining the volume of the tensor. As discussed above, this depth-to-space transformation can generally include any suitable dimensionality transformation, such as the element-wise transformation discussed with reference to FIG. 1, the region-wise transformation discussed with respect to FIG. 2, and the like. In some aspects, the depth-to-space transformation and space-to-depth transformation are selected to be complementary (e.g., if an element-wise space-to-depth transformation is used, then an element-wise depth-to-space transformation should also be used).

As depicted in block 535, the resulting tensor can then be returned as output from the bottleneck layer of the model (e.g., as input to the next layer).

Figure 6:
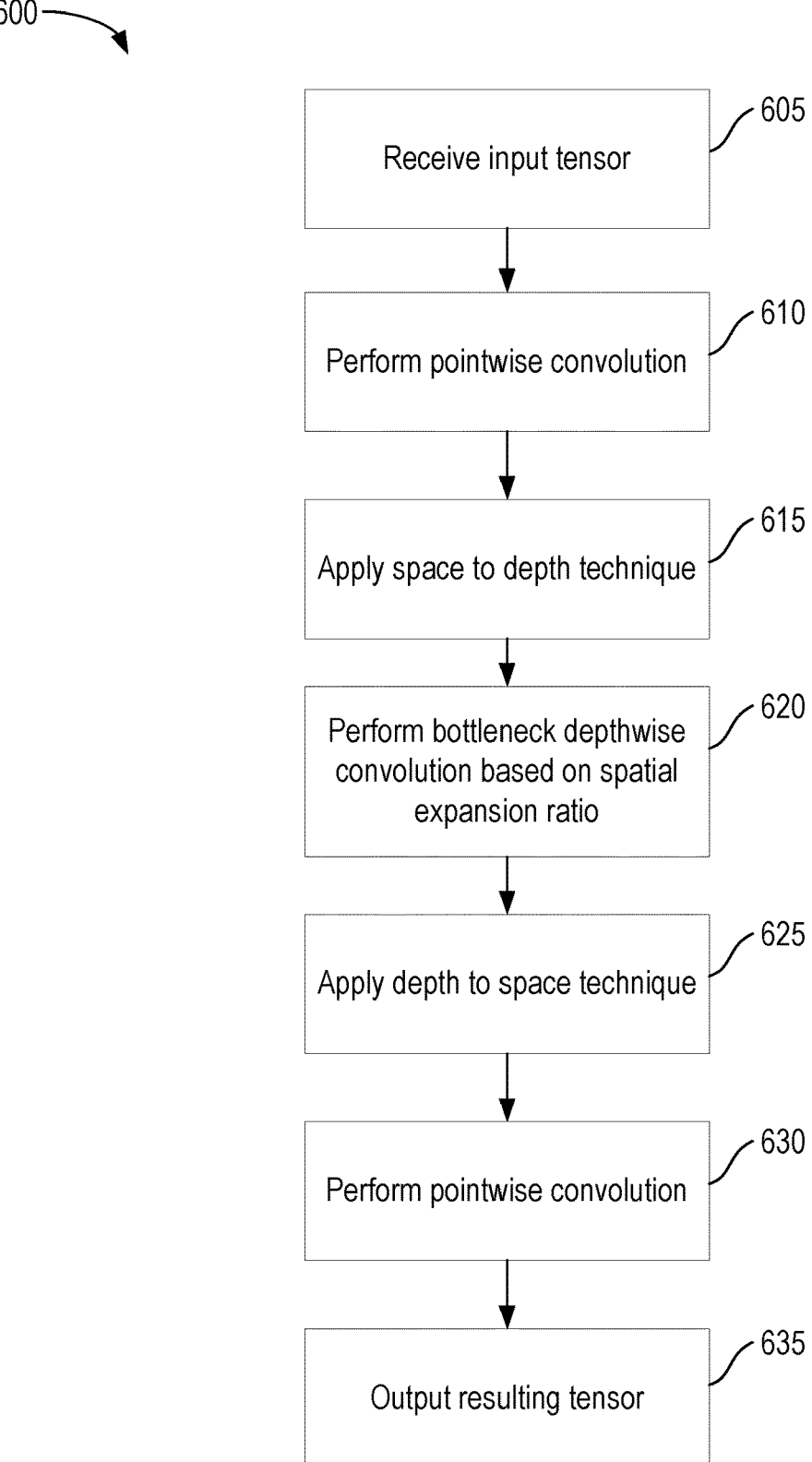
FIG. 6 is another example flow diagram illustrating a method for processing data tensors in a bottleneck block using dimensionality transformations to improve efficiency.

Example Method for Processing Data Using Dimensionality Transformations Across Depthwise Convolution FIG. 6 is an example flow diagram illustrating a method 600 for processing data tensors in a bottleneck block using dimensionality transformations to improve processing efficiency. In one aspect, the method 600 corresponds to the bottleneck block 400 described above with reference to FIG. 4.

In some aspects, as discussed above, the method 600 may be selectively used to replace one or more conventional bottlenecks in an existing neural network architecture. For example, the method 600 may be used by low power devices, only in selected portions of the model (e.g., only in the latter half of the model), and the like.

The method 600 begins at block 605, where an input tensor is received. As discussed above, this tensor is input to a bottleneck layer, but may not be the original input to the model. That is, the input tensor may be an output tensor from a prior layer in the model. The input tensor has an existing dimensionality, including a spatial dimensionality (also referred to as height and width) and a channel dimensionality (also referred to as depth).

At block 610, a pointwise convolution is performed on the input tensor to generate an intermediate tensor. As discussed above with reference to pointwise convolution 410 in FIG. 4, this may be a conventional pointwise convolution. That is, because the method 400 uses the dimensionality transformations immediately before and after the depthwise convolution, existing conventional pointwise convolutions can be used.

The method 600 then continues to block 615, where a space-to-depth transformation is applied to the intermediate tensor (generated using the pointwise convolution in block 610) to reduce the spatial dimensionality of the intermediate tensor and increase the channel dimensionality, while maintaining the volume of the intermediate tensor. This space-to-depth transformation can include any suitable dimensionality transformation, such as the element-wise transformation discussed with reference to FIG. 1, the region-wise transformation discussed with respect to FIG. 2, and the like.

At block 620, a bottleneck depthwise convolution is performed on the transformed intermediate tensor to generate a second intermediate tensor, based at least in part on the spatial expansion ratio. For example, as discussed above with reference to depthwise convolution 430 in FIG. 4, the depthwise convolution may be performed using a number of kernels defined at least in part on the spatial expansion ratio. This yields a second intermediate tensor.

The method 600 then continues to block 625, where a depth-to-space transformation is applied on the second intermediate tensor (generated using the depthwise convolution in block 620) to increase the spatial dimensionality of the tensor and reduce the channel dimensionality, while maintaining the volume of the tensor. As discussed above, this depth-to-space transformation can generally include any suitable dimensionality transformation, such as the element-wise transformation discussed with reference to FIG. 1, the region-wise transformation discussed with respect to FIG. 2, and the like.

At block 630, a pointwise convolution is performed on the transformed second tensor. As discussed above with reference to pointwise convolution 450 in FIG. 4, this may be a conventional pointwise convolution. That is, because the method 400 uses the dimensionality transformations imme-diately before and after the depthwise convolution, existing conventional pointwise convolutions can be used.

As depicted in block 635, the resulting tensor can then be returned as output from the bottleneck layer of the model (e.g., to a subsequent layer of the model).

Figure 7:
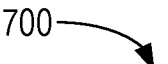
FIG. 7 is an example flow diagram illustrating a method for processing a bottleneck block using dimensionality transformations to improve efficiency.
Figure 7:
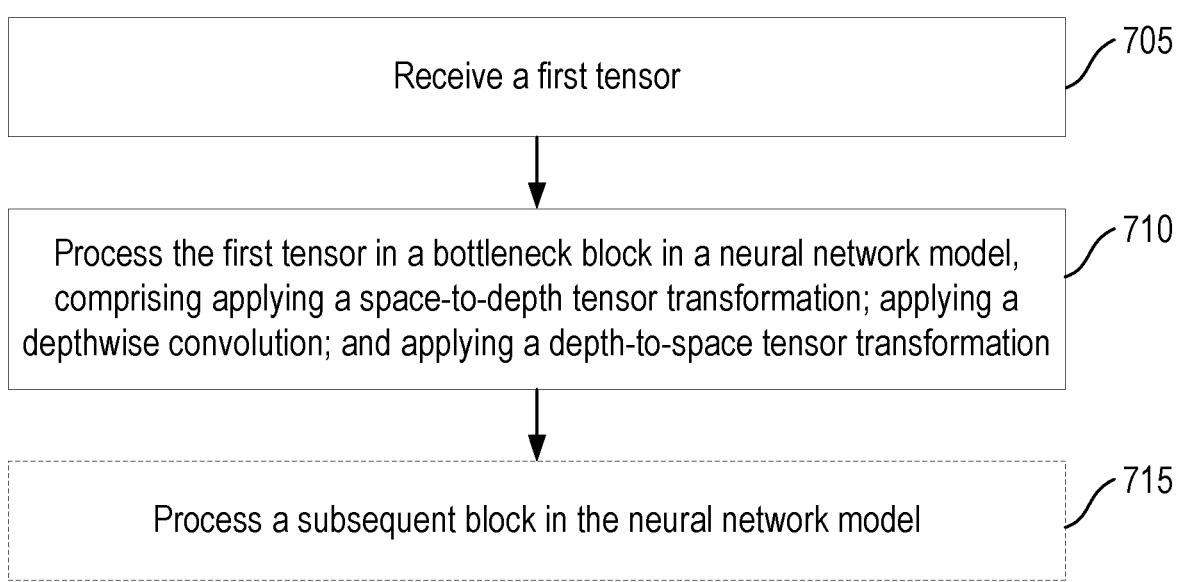

Example Method for Processing Bottleneck Layers Using Dimensionality Transformation FIG. 7 is an example flow diagram illustrating a method 700 for processing a bottleneck block using dimensionality transformations to improve efficiency.

The method 700 begins at block 705, where a first tensor is received.

At block 710, the first tensor is processed in a bottleneck block in a neural network model, comprising applying a space-to-depth tensor transformation, applying a depthwise convolution, and applying a depth-to-space tensor transfor-mation.

In some aspects, the space-to-depth tensor transformation is configured to decrease spatial dimensionality of an input tensor to the space-to-depth tensor transformation by a spatial factor r and increase channel dimensionality of the input tensor to the space-to-depth tensor transformation by the spatial factor r, wherein a volume of an output vector from the space-to-depth tensor transformation matches a volume of the input tensor to the space-to-depth tensor transformation.

In some aspects, the depth-to-space tensor transformation is configured to increase spatial dimensionality of an input tensor to the depth-to-space tensor transformation by a spatial factor r and decrease channel dimensionality of the input tensor to the depth-to-space tensor transformation by the spatial factor r, wherein a volume of an output vector from the depth-to-space tensor transformation matches a volume of the input tensor to the depth-to-space tensor transformation.

In some aspects, the space-to-depth tensor transformation directly follows a first pointwise convolution and directly precedes the depthwise convolution of the bottleneck block.

In some aspects, the depth-to-space tensor transformation directly follows a second pointwise convolution of the bottleneck block.

In some aspects, the first pointwise convolution comprises $$\frac{tC_{in}}{r^2}$$

kernels, wherein t is a channel expansion ratio, r is a spatial expansion ratio, and $C_{in}$ is a number of channels in the first tensor.

In some aspects, output of the space-to-depth tensor transformation is a tensor with dimensionality $$tC_{in} \times \frac{H}{r} \times \frac{W}{r},$$

wherein t is a channel expansion ratio, r is a spatial expan-sion ratio, $C_{in}$ is a number of channels in the first tensor, and H and W are spatial dimensions of the first tensor.

In some aspects, the depth-to-space tensor transformation directly precedes a second pointwise convolution of the bottleneck block.

In some aspects, output of the space-to-depth tensor transformation is a tensor with dimensionality $$tC_{in}r^2 \times \frac{H}{r} \times \frac{W}{r},$$

wherein t is a channel expansion ratio, r is a spatial expan-sion ratio, $C_{in}$ is a number of channels in the first tensor, and H and W are spatial dimensions of the first tensor.

In some aspects, the method 700 further comprises deter-mining an input tensor to the neural network model exceeds a spatial dimensionality threshold, and determining a spatial factor r based on a desired spatial dimensionality of the depthwise convolution of the bottleneck block.

In some aspects, the method 700 further comprises deter-mining a compute capability characteristic of a device processing the bottleneck block in the neural network model, and replacing a segment of the neural network model with the bottleneck block based on the determined charac-teristic.

In some aspects, the neural network model comprises a plurality of bottleneck blocks, and only bottleneck blocks, of the plurality of bottleneck blocks, in a second half of the neural network model include a space-to-depth tensor trans-formation (or depth-to-space tensor transformation).

The method 700 then continues to block 715, where a subsequent block in the neural network model is optionally processed. That is, the processing system may process data (e.g., a tensor output from the bottleneck block) using a block or layer that follows the bottleneck block or layer.

Example Processing System for Efficient Bottleneck Processing Using Dimensionality Transformation In some aspects, the techniques, methods, and workflows described with reference to FIGS. 1-7 may be implemented on one or more devices or systems.

Figure 8:
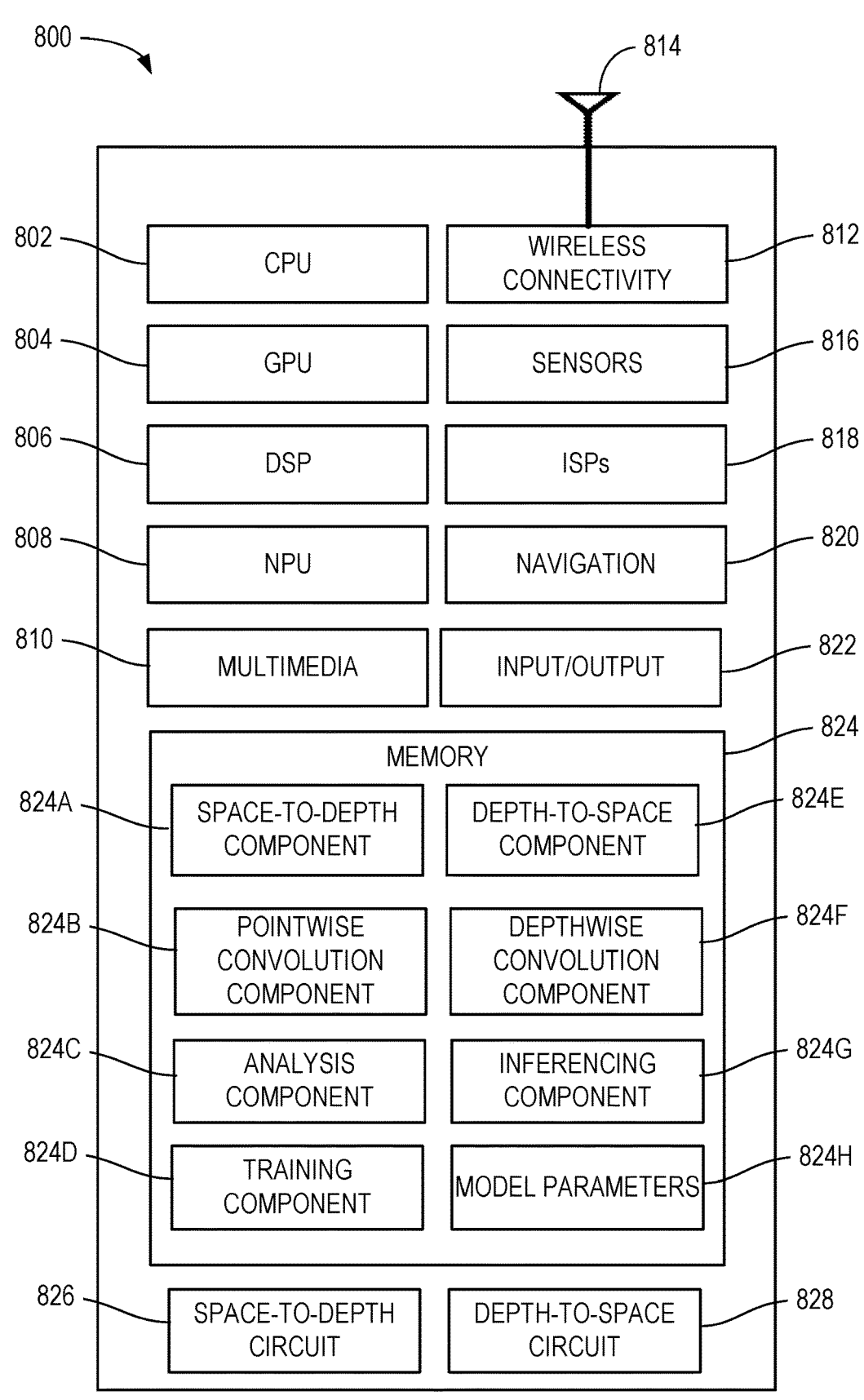
FIG. 8 depicts an example processing system configured to perform various aspects of the present disclosure.

FIG. 8 depicts an example processing system 800 which may be configured to perform aspects of the various meth-ods described herein, including, for example, the aspects described with respect to FIGS. 1-7.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition 824.

Processing system 800 also includes additional process-ing components tailored to specific functions, such as a graphics processing unit (GPU) 804, a digital signal proces-sor (DSP) 806, a neural processing unit (NPU) 808, a multimedia processing unit 810, and a wireless connectivity component 812.

An NPU, such as 808, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes a space-to-depth component 824A, a pointwise convolution component 824B, an analysis component 824C, a training component 824D, a depth-to-space component 824E, a depthwise convolution component 824F, an inferencing component 824G, and a set of model parameters 824H. These components may be configured according to one or more aspects described herein.

For example, the space-to-depth component 824A and depth-to-space component 824E may be configured to perform space-to-depth and depth-to-space tensor transformations, respectively, as part of one or more bottleneck blocks in a neural network.

The pointwise convolution component 824B and depthwise convolution component 824F may be configured to perform pointwise convolutions and depthwise convolutions, respectively, as part of one or more bottleneck blocks in a neural network.

The analysis component 824C may be configured to determine the spatial expansion ratio, determine whether to substitute an efficient bottleneck block (with space-to-depth and depth-to-space transformation layers) for one or more conventional bottlenecks in a model, and the like.

The training component 824D and inferencing component 824G may generally be configured to train one or more models (e.g., to refine the set of model parameters 824H) and to generate inferences using the models (e.g., using the trained model parameters 824H), respectively. For example, bottleneck blocks such as those illustrated in FIGS. 3 and 4 may be trained by the training component 824D.

The set of model parameters 824H can generally include parameters for one or more machine learning models (e.g., neural networks), including models using efficient bottlenecks described herein.

Processing system 800 further comprises a space-to-depth circuit 826 and depth-to-space circuit 828, which may be configured to perform space-to-depth transformations and depth-to-space transformations, respectively, via hardware.

Though depicted as a separate circuit for clarity in FIG. 8, the space-to-depth circuit 826 and depth-to-space circuit 828 may be implemented in other processing devices of processing system 800, such as within CPU 802, GPU 804, DSP 806, NPU 808, and the like.

Generally, processing system 800 and/or components thereof may be configured to perform the methods described herein.

Notably, in other aspects, aspects of processing system 800 may be omitted, such as where processing system 800 is a server computer or the like. For example, multimedia component 810, wireless connectivity 812, sensors 816, ISPs 818, and/or navigation component 820 may be omitted in other aspects. Further, aspects of processing system 800 maybe distributed between multiple devices.

The depicted components, and others not depicted, may be configured to perform various aspects of the methods described herein.

Example Clauses

Clause 1: A method, comprising: receiving a first tensor; and processing the first tensor in a bottleneck block in a neural network model, comprising: applying a space-to-depth tensor transformation; applying a depthwise convolution; and applying a depth-to-space tensor transformation.

Clause 2: The method according to Clause 1, wherein the space-to-depth tensor transformation is configured to: decrease spatial dimensionality of an input tensor to the space-to-depth tensor transformation by a spatial factor r; and increase channel dimensionality of the input tensor to the space-to-depth tensor transformation by the spatial factor r, wherein a volume of an output vector from the space-to-depth tensor transformation matches a volume of the input tensor to the space-to-depth tensor transformation.

Clause 3: The method according to any one of Clauses 1-2, wherein the depth-to-space tensor transformation is configured to: increase spatial dimensionality of an input tensor to the depth-to-space tensor transformation by a spatial factor r; and decrease channel dimensionality of the input tensor to the depth-to-space tensor transformation by the spatial factor r, wherein a volume of an output vector from the depth-to-space tensor transformation matches a volume of the input tensor to the depth-to-space tensor transformation.

Clause 4: The method according to any one of Clauses 1-3, wherein the space-to-depth tensor transformation directly follows a first pointwise convolution and directly precedes the depthwise convolution of the bottleneck block.

Clause 5: The method according to any one of Clauses 1-4, wherein the depth-to-space tensor transformation directly follows a second pointwise convolution of the bottleneck block.

Clause 6: The method according to any one of Clauses 1-5, wherein the first pointwise convolution comprises $$\frac{tC_{in}}{r^2}$$

kernels, wherein t is a channel expansion ratio, r is a spatial expansion ratio, and $C_{in}$ is a number of channels in the first tensor.

Clause 7: The method according to any one of Clauses 1-6, wherein output of the space-to-depth tensor transformation is a tensor with dimensionality $$tC_{in} \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.

Clause 8: The method according to any one of Clauses 1-7, wherein the depth-to-space tensor transformation directly precedes a second pointwise convolution of the bottleneck block.

Clause 9: The method according to any one of Clauses 1-8, wherein output of the space-to-depth tensor transformation is a tensor with dimensionality $$tC_{in}r^2 \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.

Clause 10: The method according to any one of Clauses 1-9, further comprising: determining an input tensor to the neural network model exceeds a spatial dimensionality threshold; and determining a spatial factor r based on a desired spatial dimensionality of the depthwise convolution of the bottleneck block.

Clause 11: The method according to any one of Clauses 1-10, further comprising: determining a compute capability characteristic of a device processing the bottleneck block in the neural network model; and replacing a segment of the neural network model with the bottleneck block based on the determined characteristic.

Clause 12: The method according to any one of Clauses 1-11, wherein the neural network model comprises a plurality of bottleneck blocks, and wherein only bottleneck blocks, of the plurality of bottleneck blocks, in a second half of the neural network model include a space-to-depth tensor transformation layer.

Clause 13: A system, comprising: a memory comprising computer-executable instructions; and one or more processors configured to execute the computer-executable instructions and cause the processing system to perform a method in accordance with any one of Clauses 1-12.

Clause 14: A system, comprising means for performing a method in accordance with any one of Clauses 1-12.

Clause 15: A non-transitory computer-readable medium comprising computer-executable instructions that, when executed by one or more processors of a processing system, cause the processing system to perform a method in accordance with any one of Clauses 1-12.

Clause 16: A computer program product embodied on a computer-readable storage medium comprising code for performing a method in accordance with any one of Clauses 1-12.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:
1. A computer-implemented method comprising:
receiving a first tensor;
processing the first tensor in a bottleneck block in a neural network model, comprising:
generating a first intermediate tensor based on a space-to-depth tensor transformation of the first tensor;
generating a second intermediate tensor based on a depthwise convolution of the first intermediate tensor; and generating a third intermediate tensor based on a depth-to-space tensor transformation of the second intermediate tensor;
generating an inference based on the second intermediate tensor using the neural network model; and
outputting the inference.
2. The method of claim 1, wherein the space-to-depth tensor transformation is configured to:
decrease spatial dimensionality of the first tensor input to the space-to-depth tensor transformation by a spatial factor r; and
increase channel dimensionality of the first tensor input to the space-to-depth tensor transformation by the spatial factor r, wherein a volume of the first intermediate tensor from the space-to-depth tensor transformation matches a volume of the first tensor.
3. The method of claim 1, wherein the depth-to-space tensor transformation is configured to:
increase spatial dimensionality of the second intermediate tensor input to the depth-to-space tensor transformation by a spatial factor r; and
decrease channel dimensionality of the second intermediate tensor input to the depth-to-space tensor transformation by the spatial factor r, wherein a volume of the third intermediate tensor from the depth-to-space tensor transformation matches a volume of the second intermediate tensor.
4. The method of claim 1, wherein the space-to-depth tensor transformation directly follows a first pointwise convolution and directly precedes the depthwise convolution of the bottleneck block.
5. The method of claim 4, wherein the depth-to-space tensor transformation directly follows a second pointwise convolution of the bottleneck block.
6. The method of claim 5, wherein the first pointwise convolution comprises $$\frac{tC_{in}}{r^2}$$

kernels, wherein t is a channel expansion ratio, r is a spatial expansion ratio, and $C_{in}$ is a number of channels in the first tensor.
7. The method of claim 5, wherein the first intermediate tensor is a tensor with dimensionality $$tC_{in} \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.
8. The method of claim 4, wherein the depth-to-space tensor transformation directly precedes a second pointwise convolution of the bottleneck block.
9. The method of claim 8, wherein the first intermediate tensor is a tensor with dimensionality $$tC_{in}r^2 \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.

10. The method of claim 1, further comprising:

determining the first tensor exceeds a spatial dimensionality threshold; and determining a spatial factor r based on a desired spatial dimensionality of the depthwise convolution of the bottleneck block.

11. The method of claim 1, further comprising:

determining a compute capability characteristic of a device processing the bottleneck block in the neural network model; and replacing a segment of the neural network model with the bottleneck block based on the determined characteristic.

12. The method of claim 1, wherein the neural network model comprises a plurality of bottleneck blocks, and wherein only bottleneck blocks, of the plurality of bottleneck blocks, in a second half of the neural network model include a space-to-depth tensor transformation layer.

13. A non-transitory computer-readable medium comprising computer-executable instructions that, when executed by one or more processors of a processing system, cause the processing system to perform an operation comprising:

receiving a first tensor;

processing the first tensor in a bottleneck block in a neural network model, comprising:

generating a first intermediate tensor based on a space-to-depth tensor transformation of the first tensor;

generating a second intermediate tensor based on a depthwise convolution of the first intermediate tensor; and generating a third intermediate tensor based on a depth-to-space tensor transformation of the second intermediate tensor;

generating an inference based on the second intermediate tensor using the neural network model; and outputting the inference.

14. The non-transitory computer-readable medium of claim 13, wherein the space-to-depth tensor transformation is configured to:

decrease spatial dimensionality of the first tensor to the space-to-depth tensor transformation by a spatial factor r; and increase channel dimensionality of the first tensor to the space-to-depth tensor transformation by the spatial factor r, wherein a volume of the first intermediate tensor from the space-to-depth tensor transformation matches a volume of the first tensor.

15. The non-transitory computer-readable medium of claim 13, wherein the depth-to-space tensor transformation is configured to:

increase spatial dimensionality of the second intermediate tensor input to the depth-to-space tensor transformation by a spatial factor r; and decrease channel dimensionality of the second intermediate tensor input to the depth-to-space tensor transformation by the spatial factor r, wherein a volume of the third intermediate tensor from the depth-to-space tensor transformation matches a volume of the second intermediate tensor.

16. The non-transitory computer-readable medium of claim 13, wherein the space-to-depth tensor transformation directly follows a first pointwise convolution and directly precedes the depthwise convolution of the bottleneck block.

17. The non-transitory computer-readable medium of claim 16, wherein the depth-to-space tensor transformation directly follows a second pointwise convolution of the bottleneck block.

18. The non-transitory computer-readable medium of claim 17, wherein the first pointwise convolution comprises $$\frac{tC_{in}}{r^2}$$

kernels, wherein t is a channel expansion ratio, r is a spatial expansion ratio, and $C_{in}$ is a number of channels in the first tensor.

19. The non-transitory computer-readable medium of claim 17, wherein the first intermediate tensor is a tensor with dimensionality $$tC_{in} \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.

20. The non-transitory computer-readable medium of claim 16, wherein the depth-to-space tensor transformation directly precedes a second pointwise convolution of the bottleneck block.

21. The non-transitory computer-readable medium of claim 20, wherein the first intermediate tensor is a tensor with dimensionality $$tC_{in}r^2 \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.

22. The non-transitory computer-readable medium of claim 13, the operation further comprising:

determining the first tensor exceeds a spatial dimensionality threshold; and determining a spatial factor r based on a desired spatial dimensionality of the depthwise convolution of the bottleneck block.

23. The non-transitory computer-readable medium of claim 13, the operation further comprising:

determining a compute capability characteristic of a device processing the bottleneck block in the neural network model; and replacing a segment of the neural network model with the bottleneck block based on the determined characteristic.

24. The non-transitory computer-readable medium of claim 13, wherein the neural network model comprises a plurality of bottleneck blocks, and wherein only bottleneck blocks, of the plurality of bottleneck blocks, in a second half of the neural network model include a space-to-depth tensor transformation.

25. A processing system comprising:

at least one memory comprising computer-executable instructions; and one or more processors configured to execute the computer-executable instructions and cause the processing system to perform an operation comprising:

receiving a first tensor;

processing the first tensor in a bottleneck block in a neural network model, comprising:

generating a first intermediate tensor based on a space-to-depth tensor transformation of the first tensor;

generating a second intermediate tensor based on a depthwise convolution of the first intermediate tensor; and generating a third intermediate tensor based on a depth-to-space tensor transformation of the second intermediate tensor;

generating an inference based on the second intermediate tensor using the neural network model; and outputting the inference.

26. The processing system of claim 25, wherein the space-to-depth tensor transformation directly follows a first pointwise convolution and directly precedes the depthwise convolution of the bottleneck block.

27. The processing system of claim 26, wherein the depth-to-space tensor transformation directly follows a second pointwise convolution of the bottleneck block.

28. The processing system of claim 26, wherein the first pointwise convolution comprises $$\frac{tC_{in}}{r^2}$$

kernels, wherein t is a channel expansion ratio, r is a spatial expansion ratio, and $C_{in}$ is a number of channels in the first tensor.

29. The processing system of claim 26, wherein the first intermediate tensor is a tensor with dimensionality $$tC_{in} \times \frac{H}{r} \times \frac{W}{r},$$

wherein t is a channel expansion ratio, r is a spatial expansion ratio, $C_{in}$ is a number of channels in the first tensor, and H and W are spatial dimensions of the first tensor.

30. The processing system of claim 25, wherein the depth-to-space tensor transformation directly precedes a second pointwise convolution of the bottleneck block.

* * * * *